ELECTRONIC RINGING APPARATUS

Original Filed July 28, 1952 8 Sheets-Sheet 1

INVENTOR.
Robert B. Trousdale
BY T. L. Bowes
Attorney

April 29, 1958 R. B. TROUSDALE 2,832,838

ELECTRONIC RINGING APPARATUS

Original Filed July 28, 1952 8 Sheets-Sheet 2

INVENTOR.
Robert B. Trousdale
BY T. L. Bowes
Attorney

INVENTOR.
Robert B. Trousdale
BY
T. L. Bowes
Attorney

ELECTRONIC RINGING APPARATUS

Original Filed July 28, 1952 8 Sheets-Sheet 4

Harmonic Ringing Frequency Generator-98

INVENTOR.
Robert B. Trousdale
BY T. L. Bowes
Attorney

April 29, 1958 R. B. TROUSDALE 2,832,838

ELECTRONIC RINGING APPARATUS

Original Filed July 28, 1952 8 Sheets-Sheet 5

Harmonic Ringing Frequency Generator-98

INVENTOR.
Robert B. Trousdale
BY
T. L. Bowes
Attorney

Harmonic Ringing Amplifier & Supply Circuit-101

INVENTOR.
Robert B. Trousdale
BY T. L. Bowes
Attorney

INVENTOR.
Robert B. Trousdale
BY T. L. Bowes
Attorney

INVENTOR.
Robert B. Trousdale
BY T. L. Bowes
Attorney

United States Patent Office 2,832,838

Patented Apr. 29, 1958

2,832,838

ELECTRONIC RINGING APPARATUS

Robert B. Trousdale, Webster, N. Y., assignor, by mesne assignments, to General Dynamics Corporation, a corporation of Delaware Original application July 28, 1952, Serial No. 301,215. Divided and this application June 23, 1955, Serial No. 517,527

19 Claims. (Cl. 179—84)

Figure 1:
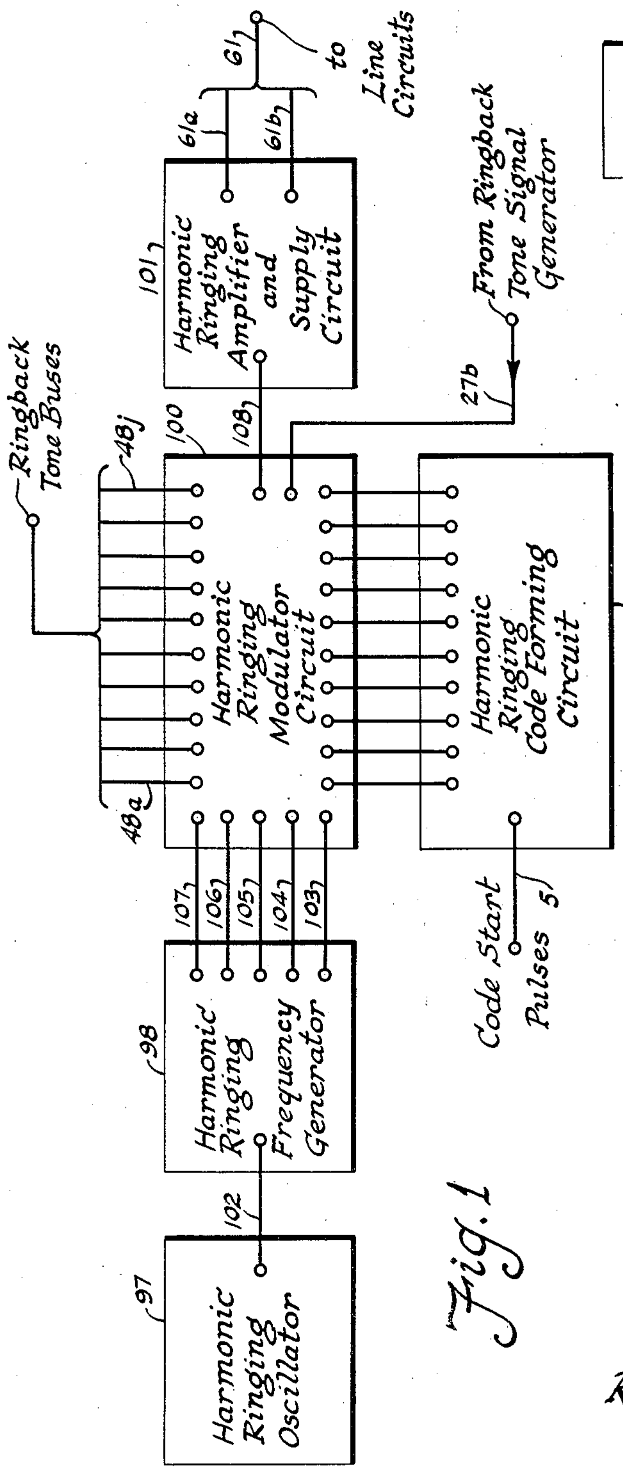

The present invention relates to ringing apparatus, and, more particularly, to harmonic ringing apparatus for developing different ringing signals and ringback tone signals suitable for use in party line telephone systems. Specifically, the present invention is a divisional application of my copending application, Serial No. 301,215, filed July 28, 1952, which application is assigned to the same assignee as the present invention, and is directed to ringing apparatus suitable for use in an electronic telephone system of the type disclosed therein.

In a telephone system of the type disclosed in my above-identified copending application, a pulse multiplex system is employed wherein pulse sampling, effectively at an ultrasonic rate, of the control and intelligence signals produced at each substation of the system is employed to provide signal channel separation. Specifically, each line of the system is assigned a particular pulse time position in each of repetitive pulse frames each comprising 100 pulse time positions. Intelligence and control signals developed on any one line of the system are sampled only in the particular pulse time position assigned to the particular line and the samples are carried through the signal transmitting components of the system as far as the connector or selector stage on multiplexer signal pulses occurring in this particular time position. In the connector or selector stage, the control signals and intelligence signals are detected and either used for control purposes, such as called line selection, or are superimposed on connector or selector signal pulses occurring in a new and different pulse time position for redistribution to the particular line and substation assigned the new time position. This same process is employed in transmitting the intelligence from the called substation back to the calling substation.

In order to provide a party line telephone system wherein only the ringer at the called substation is rung and other parties on the same line are not bothered by each call on the party line, ringers are conventionally employed at each substation which are frequency sensitive and respond only to a particular ringing frequency. A series of five ringing frequencies is usually employed and if the frequencies are harmonically related, the system is referred to as a fully selective harmonic ringing system. There ringing frequencies are usually generated by mechanical or electromechanical generators which are bulky and lack stability in operation.

In the above-identified copending application harmonic ringing of different ones of the substations associated with any one line of the system is provided by establishing a party line ringing cycle of approximately 7½ seconds' duration during which the five harmonic ringing frequencies are produced during five successive ringing periods within the ringing cycle. In order to provide for more than five substations each ringing frequency is coded during the corresponding ringing period so that either one long ringing pulse or two short ringing pulses may be selectively transmitted over the line. Such an arrangement requires ringing apparatus wherein a ringing frequency multiplexing system is employed sequentially to develop the five different ringing frequencies on a common conductor which is supplied to all of the line circuits of the system. In addition, ringback tone signals, which are coded in the same manner as the ringing frequencies, are employed to control the transmission of each ringing frequency to the called line and to inform the calling subscriber of the selected code intervals during which the called line is rung.

It is, therefore, an object of the present invention to provide new and improved ringing apparatus for a telephone system.

It is another object of the present invention to provide new and improved ringing apparatus for an electronic telephone system wherein a plurality of ringing frequencies are multiplexed on a common output conductor.

It is a further object of the present invention to provide new and improved electronic ringing apparatus wherein a plurality of ringing frequencies are all controlled from a single standard frequency source.

It is a still further object of the invention to provide new and improved ringing apparatus wherein corresponding ringing frequencies and ringback tone signals are developed during successive ringing periods in an overall ringing cycle.

Another object of the present invention resides in the provision of new and improved ringing apparatus for developing a plurality of ringing frequencies wherein common filtering means is employed to modify the waveshape of all of said ringing frequencies.

A further object of the present invention resides in the provision of new and improved ringing apparatus having common coding means for developing harmonically related ringing frequencies and a series of ringback tone signals.

Figure 9:
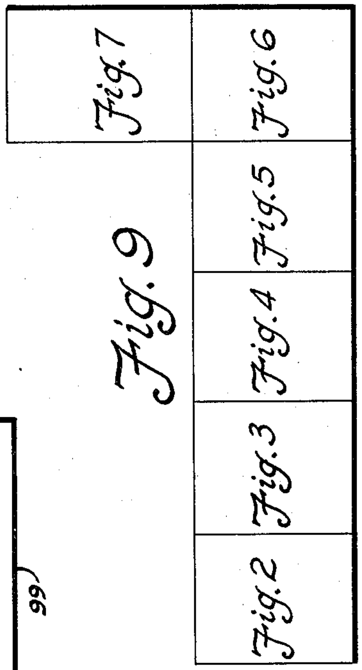
Figure 6:
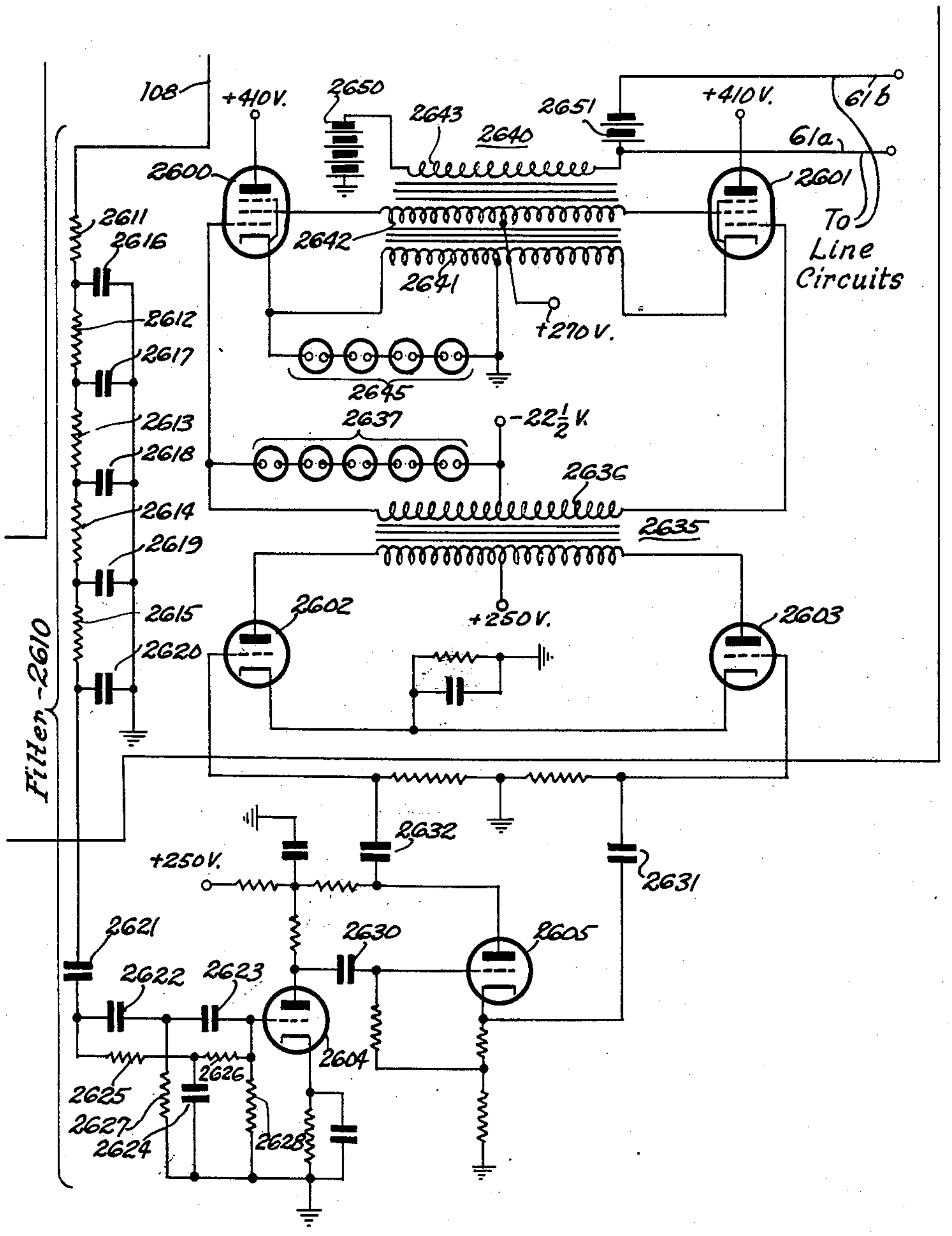
Figure 7:
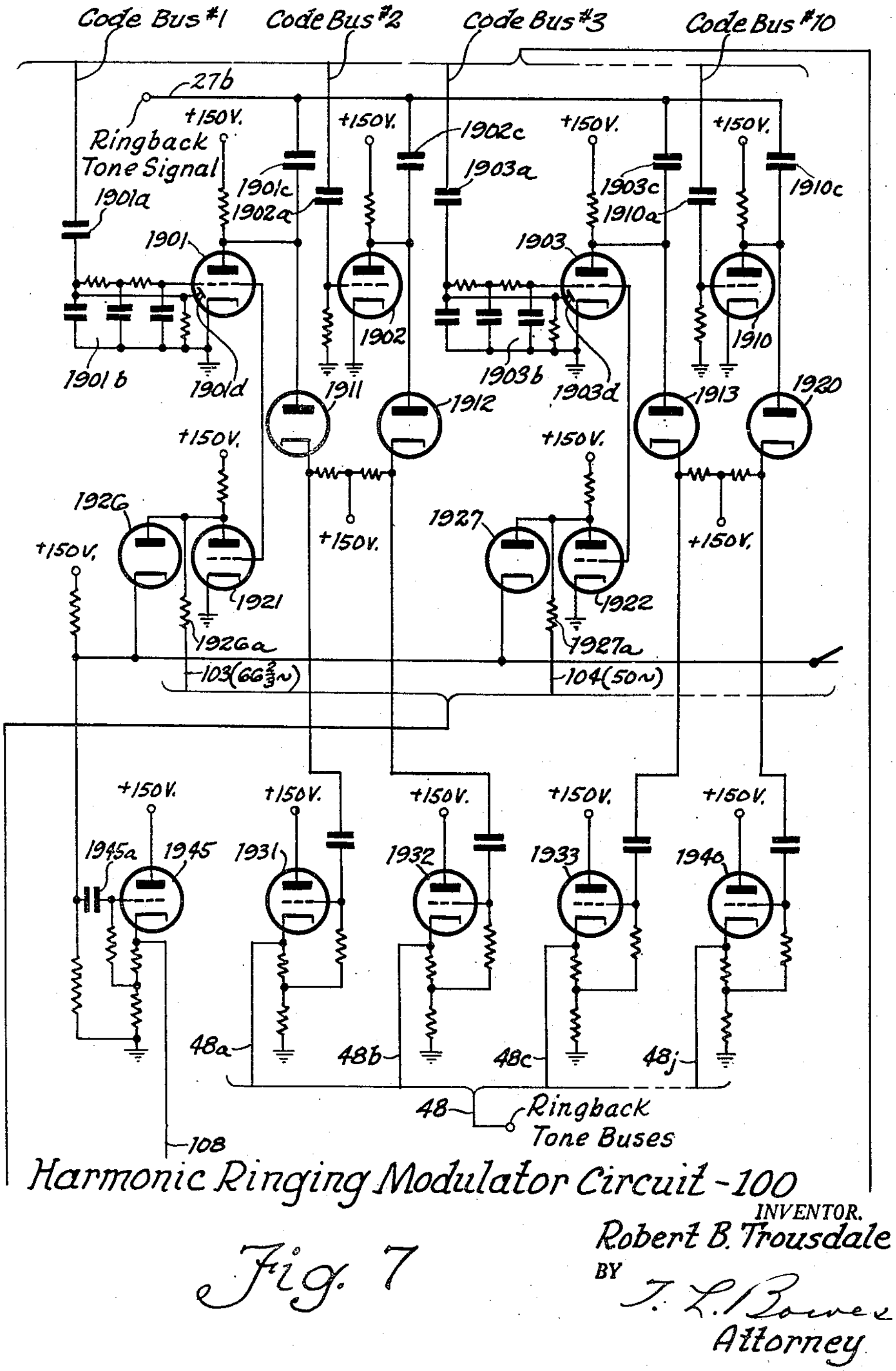
Figure 8:
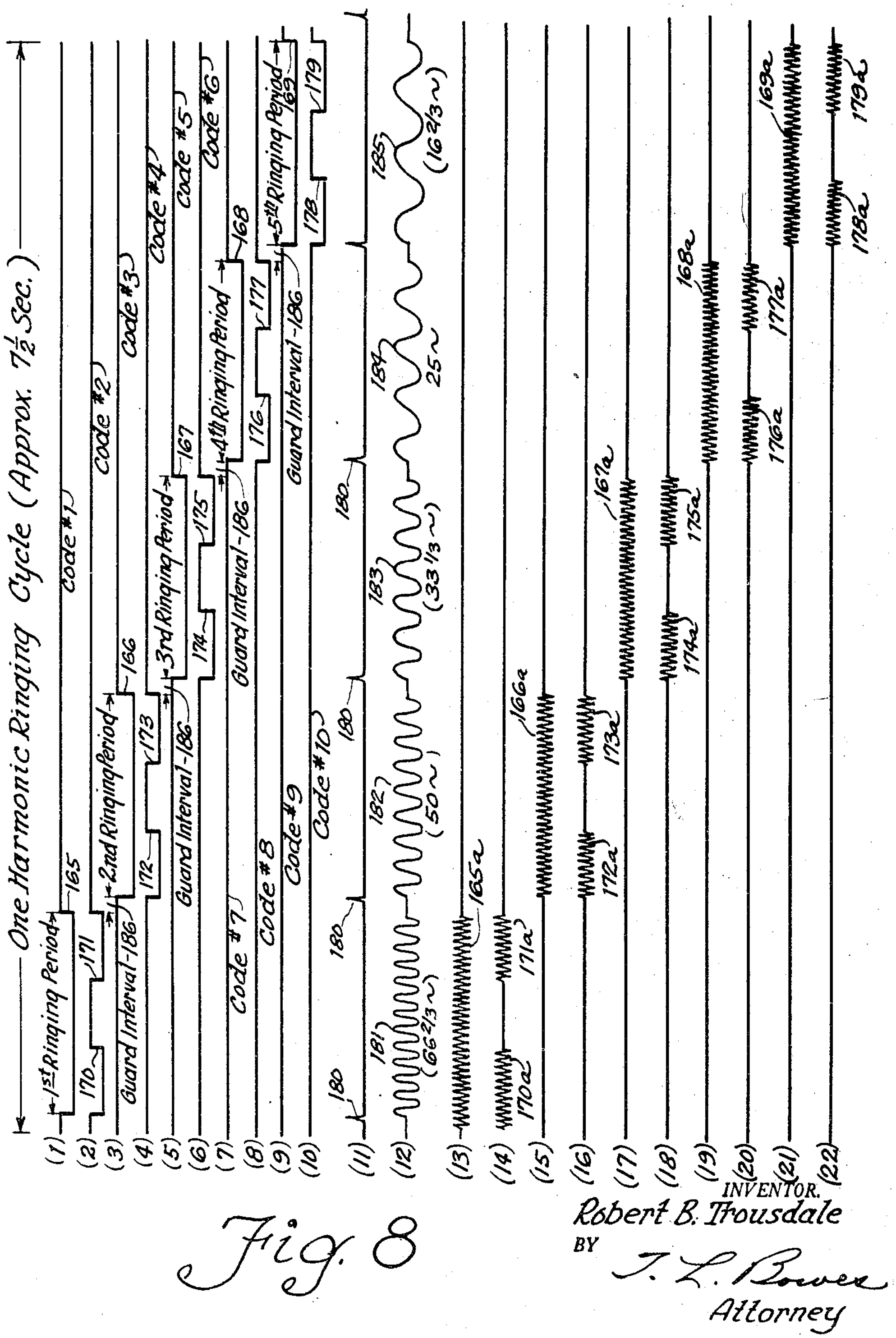

The invention, both as to its organization and method of operation, together with further objects and advantages thereof, will best be understood by reference to the following specification taken in connection with the accompanying drawings in which:

Fig. 1 is a block diagram of the component units of the ringing apparatus of the present invention;

Figs. 2 to 7, inclusive, when arranged in the manner shown in Fig. 9, comprise a schematic diagram showing the details of the ringing apparatus of Fig. 1, and Fig. 8 graphically illustrates the time relationships between certain waveforms developed in the ringing apparatus of Fig. 1.

Referring now to the drawings, and, more particularly to Fig. 1 thereof, the ringing apparatus of the present invention is therein illustrated as comprising a harmonic ringing oscillator 97, a harmonic ringing frequency generator 98, a harmonic ringing code forming circuit 99, a harmonic ringing modulator circuit 100 and a harmonic ringing amplifier and supply circuit 101. The units 97 to 101, inclusive, constitute ringing apparatus suitable for providing party line ringing on either a fully selective or semi-selective basis in a telephone system of the type described in detail in my above-identified copending application. Thus, if a maximum of five substations are connected to one of the lines of the system, a fully selective harmonic party line ringing system is employed wherein each of the substations is provided with ringing facilities which respond to different ringing frequencies. Each of the five substations is assigned a different ringing period of approximately 1½ seconds' duration, which ringing periods recur in successive ringing cycles of 7½ seconds' duration. Thus, any one of the five substations is rung for a period of 1½ seconds followed by a period of 6 seconds of silence and only the particular substation which responds to the ringing frequency transmitted during a particular ringing period is rung. If more than five substations, up to a maximum of ten substations, are associated with one of the lines of the system, a semi-selective harmonic ringing service is provided wherein pairs of substations are provided with ringing facilities which respond to the same ringing frequency and each ringing period is coded to provide either one long ring or two short rings during the particular ringing period assigned to each pair of substations. With this arrangement two substations are rung simultaneously with either a long ring of 1½ seconds or two short rings of ½ second duration separated by ½ second of silence, and the called line subscribers distinguish between their own calls and that of the other subscriber assigned the same ringing frequency by determining whether it is one long or two short rings.

The oscillator 97, which operates independently of the other components of the telephone system, is designed to operate at an audio frequency (preferably 1200 cycles) which is suitable for subdivision into a group of harmonically related ringing frequencies. The oscillator 97 is connected over the conductor 102 to the harmonic ringing frequency generator 98 which operates under the control of the 1200 cycle signal from the oscillator 97 to develop five continuous wave ringing signals of different frequencies which are suitable for exciting the ringing facilities of five different substations connected to one of the lines of the system. In the illustrated embodiment the ringing frequencies developed by the generator 98 correspond to the frequencies of the conventional harmonic ringing series so that conventional frequency sensitive ringers may be employed in the substations of the system. Thus, continuous wave signals having the frequencies 16⅔ C. P. S., 25 C. P. S., 33⅓ C. P. S., 50 C. P. S., and 66⅔ C. P. S. are respectively impressed upon the conductors 103–107, inclusive. However, it will be understood that either of the two other series of ringing frequencies, i. e., the synchromonic series or the decimonic series, may be developed in substantially the same manner as will be described in more detail hereinafter.

The code forming circuit 99 operates independently of the other components of the telephone system and develops two different party line code ringing signals during each of five successive ringing periods which recur during repetitive ringing cycles established by the circuit 99. In the illustrated embodiment each ringing period lasts for approximately 1½ seconds and is separated from the adjacent ringing periods by a short guard interval, the over-all ringing cycle being approximately 7½ seconds long. During each of the five ringing periods the code forming circuit 99 produces both a long ringing pulse, which lasts for 1½ seconds, and two short ringing pulses each of ½ second duration separated by a ½ second silent period. The series of ten coded ringing pulses formed by the circuit 99 are used to control the harmonic ringing modulator circuit 100 wherein the 1½ second ringing pulses are used as gating pulses sequentially to gate to a common output conductor 108 the different ringing frequencies impressed on the conductors 103–107, inclusive, by the generator 98, and the multiplexed ringing frequencies thus impressed on the conductor 108 are transmitted to the harmonic ringing amplifier and supply circuit 101. A continuous audible ringback tone signal (preferably 200 C. P. S.) is supplied from a suitable generator (not shown) over the conductor **27*b* to the harmonic ringing modulator circuit 100. Each one of the ten codes formed by the circuit 99 is used to develop corresponding pulses of ringback tone on the ten ringback tone conductors 48*a*–48*j*, inclusive, which form the illustrated ringback tone cable 48. These ringback tone pulses are transmitted over the cable 48 to the connectors of the telephone system wherein they are employed to control the transmission of a ringing signal over the called line, as described in more detail in the above identified copending application. The harmonic ringing amplifier and supply circuit 101 filters and amplifies the multiplexed ringing frequencies transmitted thereto over the conductor 108, and includes a combined bias voltage and multiplex ringing current source which is connected to each of the line circuits of the system over the common multiple conductors 61*a* and 61*b* forming the illustrated cable 61**.

In order to render the mode of operation of the harmonic ringing apparatus of the present invention more readily understandable, a harmonic code sequence chart has been illustrated in Fig. 8 to show the time and phase relationship of the signals developed by the harmonic ringing code forming circuit 99 and the harmonic ringing modulator circuit 100 during one harmonic ringing cycle. As there shown, the code forming circuit 99 develops a series of long ringing pulses 165, 166, 167, 168 and 169 on five different output code buses thereof which recur in succession during successive harmonic ringing cycles of approximately 7½ seconds' duration. The long ringing pulses 165–169, inclusive, define a succession of five ringing periods which are separated by guard intervals 186 of relatively short duration. The code forming circuit 99 also operates to produce on five other code buses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180 (Fig. 8 (11)) which occur substantially at the end of each of the guard intervals 186. The code start pulses 180 are transmitted over the common conductor 5 to each of the connectors of the system to delay the selection of a particular party line ringing signal until the end of a particular ringing period, as described in more detail in the above identified copending application.

The long riging pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage wave form substantially as shown in Fig. 8 (12). Thus, during the first ringing period the ringing pulse 165 is used to gate a 66⅔ C. P. S. ringing voltage to the common conductor 108. After the guard interval 186, the ringing pulse 166 is employed to gate a 50 C. P. S. ringing voltage to the conductor 108 during the second ringing period. Likewise, the successive ringing pulses 167, 168 and 169 are employed successively to gate to the common output conductor 108 ringing voltages having frequencies of 33⅓ C. P. S., 25 C. P. S., and 16⅔ C. P. S.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being run in a particular code sequence, the long and short pulses (Fig. 8 (1)–(10), inclusive) developed by the harmonic ringing code forming circuit 99 are used individually to gate to the output conductors **48*a*–48*j*, inclusive, a ringback tone signal for the duration of the ringing pulse. Thus, the ringing pulse 165 developed in the code forming circuit 99 is used to develop a ringback tone signal 165*a* which persists for the duration of the first ringing period. Likewise, the short ringing pulses 170 and 171 are employed to produce the ringback tone signals 170*a* and 171*a* which have a duration of ½ second and are separated by a ½ second interval, the signals 170*a* and 171*b*** also occurring during the first ringing period.

In the same manner the pulses 166, 172 and 173 are employed to develop the corresponding ringback tone signals shown in Fig. 8 (15) and (16) during the second ringing period. In a similar manner the long and short ringing pulses which are produced during the third, fourth, and fifth ringing periods are employed to produce the ringback tone signals shown in Fig. 8 (17)–(22), inclusive.

Figure 2:
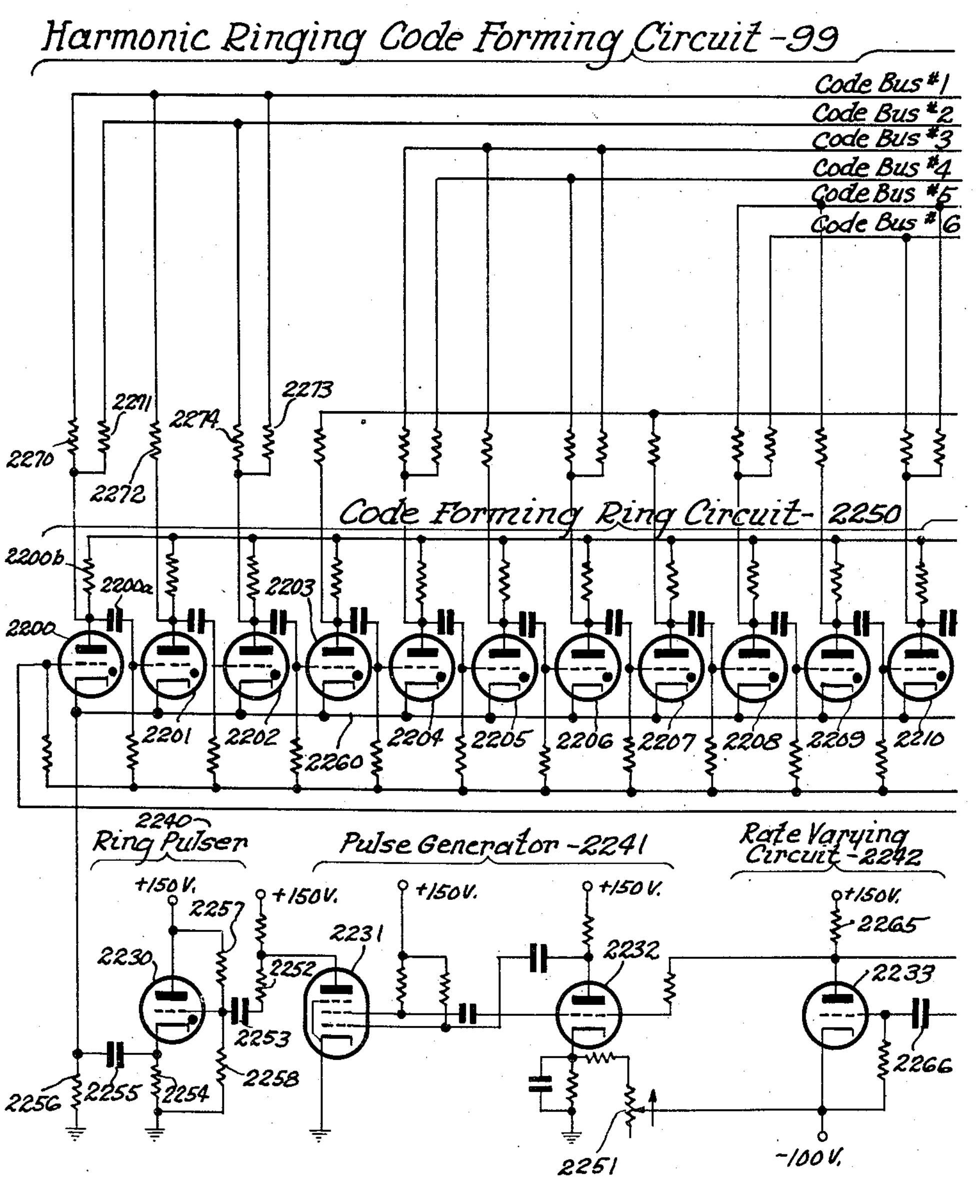

With the above general description of the harmonic code sequence chart illustrated in Fig. 2 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals. In the event that a maximum of five substations are associated with any one line of the system, only the long ringing pulses 165–169, inclusive, need be employed and under these conditions the first substation would be provided with ringing facilities which are responsive to a 66⅔ C. P. S. ringing current, the second substation would be provided with ringing facilities which are responsive to 50 C. P. S. ringing current, the third substation would be provided with ringing facilities responsive to 33⅓ C. P. S. ringing current, the fourth substation would be provided with ringing facilities responsive to 25 C. P. S. ringing current, and the fifth substation would be provided with ringing facilities responsive to 16⅔ C. P. S. ringing current. The five substations would be assigned different third digit directory number designations and one of the ringback tones 165*a*–169*a*, inclusive, would be selected in the connector in response to the dialing of a third digit at the calling substation. If, for example, a substation having ringing facilities responsive to 66⅔ C. P. S. ringing current is selected in the connector, the ringback tone signal 165*a* is selected and is used to control the application of ringing current so that only the 66⅔ C. P. S. signal 181 (Fig. 8 (12)) is applied to the called line and only the substation having ringing facilities which respond to this ringing frequency will be rung.

In the event that more than five substations up to a maximum of ten are associated with one of the lines of the system, the group of substations is divided into pairs and each pair of substations is provided with ringing facilities responsive to the same ringing frequency. Thus, assuming that substations A′ and B′ are associated with one of the lines of the system and are assigned the directory number designations 321 and 322, both of these substations would be provided with ringing facilities responsive to the same ringing current, for example a 66⅔ C. P. S. ringing current. If the calling subscriber wishes to call substation A′ he dials 321 and the connector responds to the third digit of "1" by selecting the ringback tone signal 165*a* so that a 66⅔ C. P. S. ringing current is transmitted over the called line during the entire first ringing period. Only the ringers at the substations A′ and B′ will then be rung for a period of approximately 1½ seconds and the subscriber at the substation A′ will know that the call is intended for him. On the other hand, if the calling subscriber wishes to call the substation B′ he dials the number 322 and the connector responds to the third digit of "2" by selecting the ringback tone signal consisting of the short pulses 170*a* and 171*a* which control the application of 66⅔ C. P. S. ringing current to the line so that the ringing facilities at both the substations A′ and B′ are rung in two short rings. The subscriber at the substation B′ is then notified that his substation is being rung.

In the following detailed description of the system components briefly described above the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely functions which will be readily understood by those skilled in the are, have not been identified in the drawings or referred to in the following description of the system components.

As used in this specification the term electronic and electronic means refer to and are intended to define means comprising electron conducting devices, such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

*Harmonic ringing oscillator 97*

Figure 4:
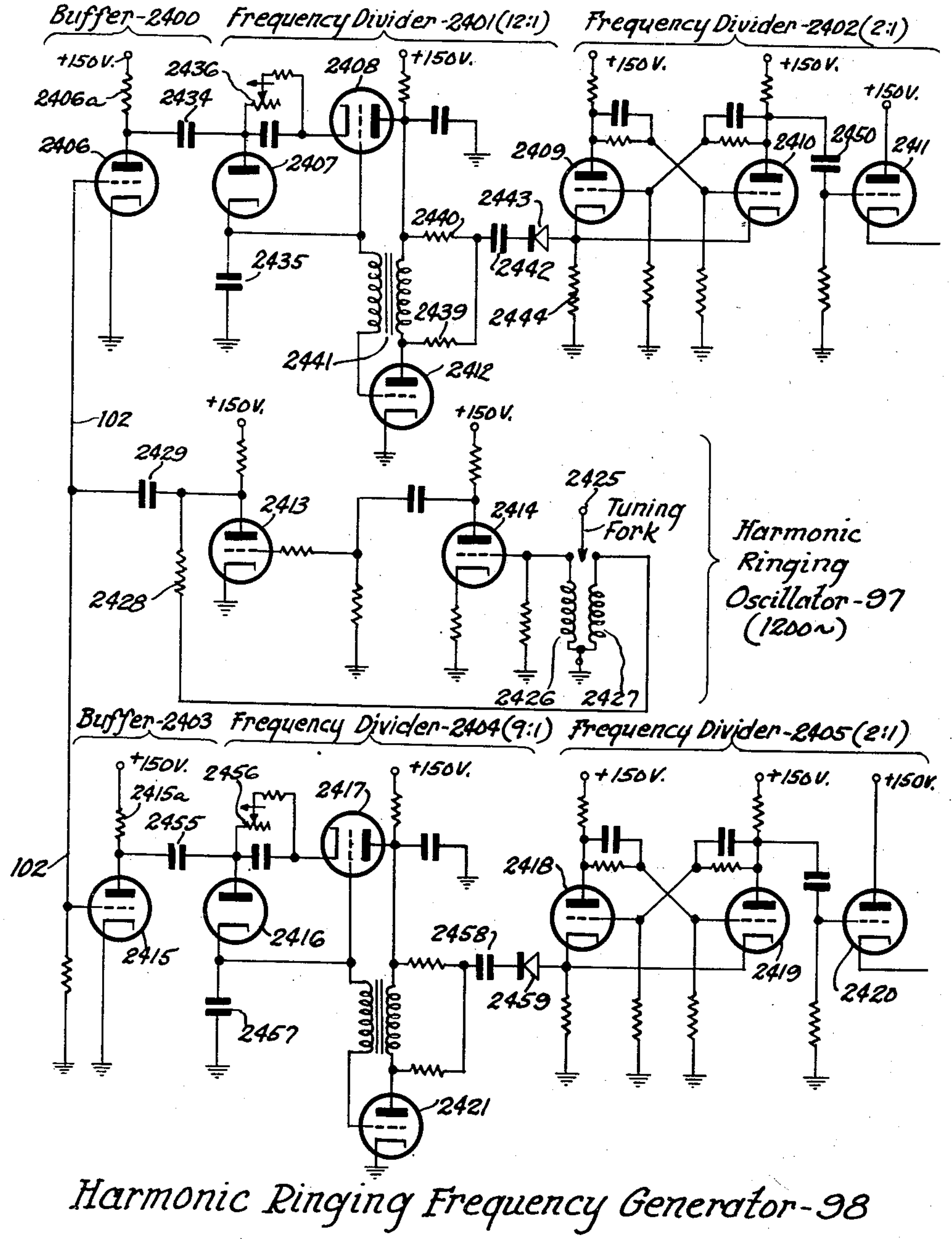

As discussed briefly in connection with the general description of the apparatus, this circuit, which is shown in detail in Fig. 4 of the drawings, is designed to provide a highly accurate and stable reference frequency which may be used as a frequency standard to derive the five different ringing frequencies employed in the harmonic ringing system described generally above. Because of the high mechanical Q of the tuned ringers provided in the substations equipped with harmonic ringing facilities, it is necessary to maintain the several ringing frequencies within the close frequency tolerance of plus or minus one cycle per second. Since the ringing frequencies are of extremely low frequency, the lowest ringing frequency being 16⅔ C. P. S., relatively large circuit values are needed in most circuit oscillators and it would be extremely difficult to design individual oscillators suitable for this service. Furthermore, there would be no easy method of tuning such individual oscillators in the field. While accurate tuning fork oscillators are available at relatively low cost and these oscillators would be suitable for a reference frequency, such oscillators, if operated directly at the low ringing frequencies, would be inordinately large and expensive. However, in accordance with the present invention, a reference frequency is chosen which is within the range of a practical, inexpensive tuning fork oscillator and the reference frequency is chosen so that it is related in a simple mathematical manner to the desired ringing frequencies. While there are several frequencies lying within the range of 1,000 to 4,000 cycles which would be multiples of 16⅔ C. P. S., the common multiple of the other four ringing frequencies, in the illustrated embodiment a reference frequency of 1,200 C. P. S., is employed since this reference frequency may also be used as a reference frequency for the decimonic series of ringing frequencies, namely, the frequencies of 20 C. P. S., 30 C. P. S., 40 C. P. S., 50 C. P. S., and 60 C. P. S. In the synchromonic series of ringing frequencies, namely, the frequencies of 16 C. P. S., 30 C. P. S., 42 C. P. S., 54 C. P. S. and 66 C. P. S., there is no common multiple frequency since the ringing frequencies of this series are deliberately chosen to be non-harmonic. However, the 1,200 cycle reference frequency is also convenient for deriving this series of ringing frequencies.

In order to provide an accurate and stable reference frequency of 1,200 C. P. S., a tuning fork oscillator is provided as shown in detail in Fig. 4 of the drawings. Referring to this figure, the oscillator 97 comprises a modified tuning fork 2425 which is housed in a sealed unit and is constructed of a special alloy. The elastic constant of the fork varies with temperature in such a way as to compensate for the expansion or contraction of the fork and the accuracy of the fork over a range of temperatures of greater than 100° F. is one part in three thousand. The tuning fork 2425 vibrates in a magnetic field set up by the windings 2426 and 2427. The output winding 2426 is coupled to the control grid of a first high gain amplifier 2414, preferably of the commercial type 6AQ6, and the output voltage from the tube 2414 is further amplified in a second high gain amplifier 2413, also preferably of the commercial type 6AQ6. A feedback connection is provided from the anode of the tube 2413 through the resistor 2428 to the winding 2427 so that this winding acts as a driving winding to provide the necessary energy for keeping the fork in motion and a small direct current flows through the resistor 2428 and the winding 2427 to magnetize the structure of the fork. Since the two windings 2426 and 2427 are coupled to one another magnetically through the fork, the frequency induced in the output winding 2426 will be a function of the tuning fork frequency, i. e., 1200 C. P. S. The output from the second high gain amplifier 2413 is coupled through the condenser 2429 to the conductor 102 over which it is transmitted to the components of the harmonic ringing frequency generator 98.

*Harmonic ringing frequency generator 98*

Figure 5:
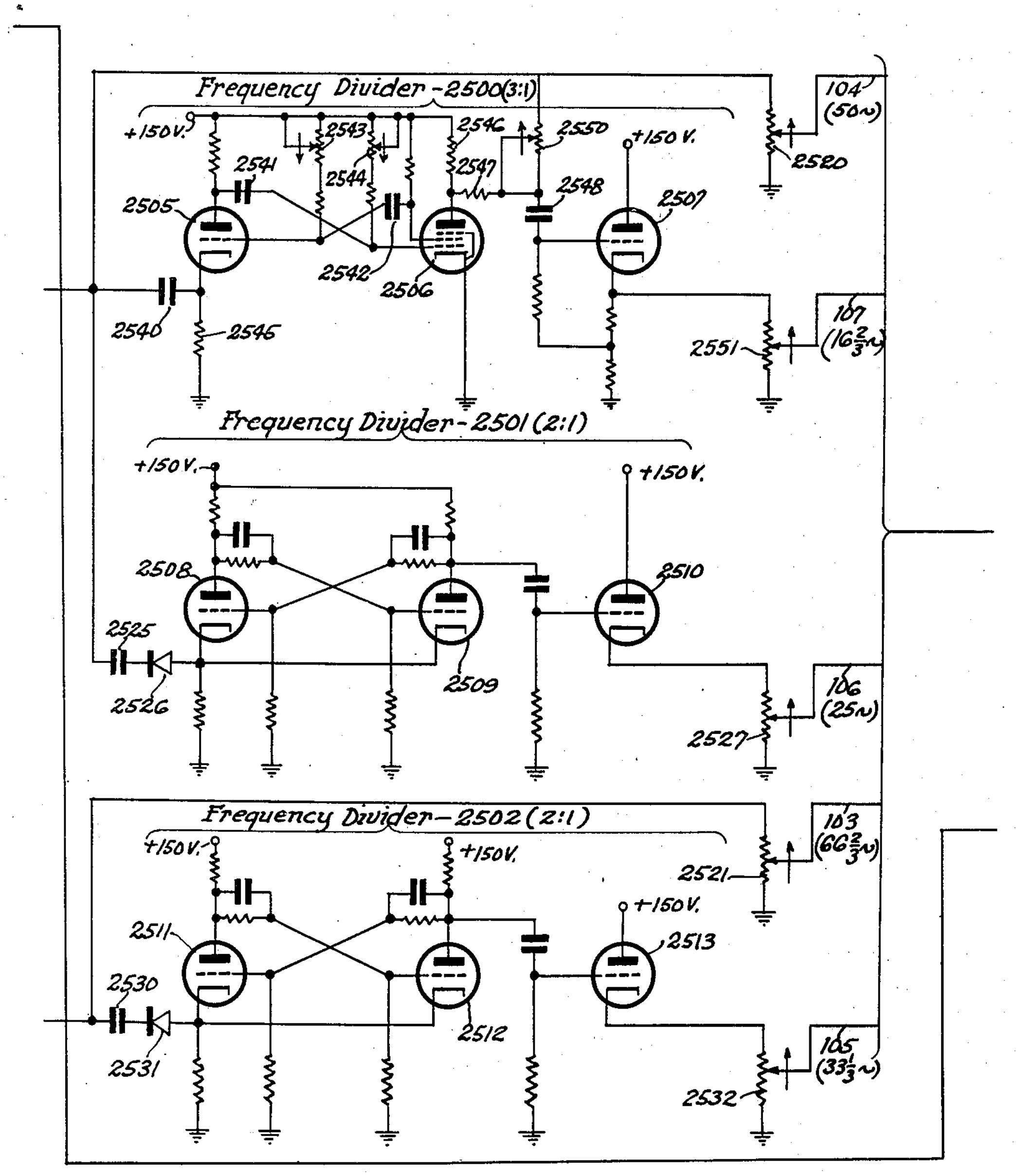

As discussed briefly in connection with the general description of the apparatus, this circuit, which is shown in detail in Figs. 4 and 5 of the drawings, is provided for the purpose of deriving the five ringing frequencies of the harmonic series, namely 16⅔ C. P. S., 25 C. P. S., 33⅓ C. P. S., 50 C. P. S., and 66⅔ C. P. S. from the 1200 cycle reference frequency produced by the harmonic ringing oscillator 97. More specifically, the harmonic ringing frequency generator 98 includes the buffer amplifiers 2400 and 2403, including the tubes 2406 and 2415, a first frequency divider 2401, comprising the tubes 2407, 2408 and 2412, which divides the 1200 C. P. S. reference frequency by twelve to obtain a 100 C. P. S. wave; a second frequency divider 2402, comprising the tubes 2409, 2410 and 2411, which divides the 100 C. P. S. wave by two to provide a 50 C. P. S. ringing frequency which is supplied to the output conductor 104; a third frequency divider 2500, comprising the tubes 2505, 2506, and 2507, which divides the 50 C. P. S. wave by three to obtain a 16⅔ C. P. S. wave which is supplied to the output conductor 107; a fourth frequency divider 2404, comprising the tubes 2416, 2417 and 2421, which divides the reference frequency by nine to obtain a 133⅓ C. P. S. wave; a fifth frequency divider 2405, comprising the tubes 2418, 2419 and 2420, which divides the 133⅓ C. P. S. wave by two to obtain a 66⅔ C. P. S. ringing frequency which is supplied to the output conductor 103; a sixth frequency divider 2502, including the tubes 2511, 2512 and 2513, which divides the 66⅔ C. P. S. wave by two to obtain a 33⅓ C. P. S. ringing frequency which is supplied to the output conductor 105, and a seventh frequency divider 2501, including the tubes 2508, 2509 and 2510 which divides the 50 C. P. S. wave by two to obtain a 25 C. P. S. ringing frequency which is supplied to the output conductor 106. The tubes 2406, 2408–2412, inclusive, 2415, 2417–2421, inclusive, 2505, and 2507–2513, inclusive, are all preferably of the commercial type 6C4, the tube 2506 is preferably of the commercial type 6AK6 and the tubes 2407 and 2416 are preferably of the commercial type 6AL5.

Considering now the operation of the harmonic ringing frequency generator in developing the five different ringing frequencies described above, the 1200 C. P. S. reference frequency produced in the manner described above by the harmonic ringing oscillator 97 is transmitted over the conductor 102 to the buffer amplifiers 2400 and 2403. More specifically, the 1200 C. P. S. reference wave is transmitted over the conductor 102 to the control grid of the buffer amplifier tube 2406 and the control grid of the buffer amplifier tube 2415. The tubes 2406 and 2415 are operated at zero bias and function to limit the positive and negative excursions of the 1200 cycle reference wave so that a 1200 C. P. S. square wave is produced across the anode resistors 2406a and 2415a of the respective tubes 2406 and 2415. The 1200 C. P. S. reference wave developed in the anode circuit of the tube 2406 is coupled to the frequency divider 2401 and the 1200 cycle reference wave developed in the anode circuit of the tube 2415 is coupled to the frequency divider 2404.

The frequency dividers 2401 and 2404 are substantially identical except for the fact that the divider 2401 divides the 1200 cycle reference frequency by twelve to to provide a 100 C. P. S. wave, and the divider 2404 divides the 1200 cycle reference frequency by nine to provide a 133⅓ C. P. S. wave. Since the dividers 2401 and 2404 are substantially identical, only a description of the divider 2401 is included herein. However, it will be understood that this description applies equally well to the divider 2404. Generally considered, the frequency divider 2401 is of the so-called step divider type which is described in the article "An Improved Counter-Timer for Television" by C. E. Hallmark, Engineering Edition of Radio News for July 1947, pages 8, 9, 22 and 23. While reference may be had to the above article for a complete and detailed description of this frequency divider, for the purposes of the present invention it may be stated that the condensers 2434 and 2435 are charged in series with the diode 2407 from the anode circuit of the buffer amplifier tube 2406. The condensers 2434 and 2435 acquire charge in inverse proportion to their capacitance values and the condenser 2434 is discharged during each step by means of the cathode follower type triode discharge tube 2408. However, the condenser 2435 retains its charge so that a staircase or stepped voltage wave is produced across the condenser 2435. The staircase voltage is applied to the control grid of a blocking oscillator tube 2412 and the tube 2412 will fire when the amplitude of the staircase wave exceeds a certain threshold limit. As a result, an output pulse is produced in the anode circuit of the blocking oscillator 2412 for each twelve steps of voltage produced across the condenser 2435, and a frequency division of 12 to 1 is accomplished. In order to provide a linear charging characteristic for the timing condenser 2435, the discharging tube 2408 is of the cathode follower type and a potentiometer 2436 is provided in the cathode circuit of the discharge tube 2408 to provide an appropriate time constant in the cathode circuit of the tube 2408 commensurate with the frequency of the 1200 cycle reference wave which is impressed upon the condensers 2434 and 2435. While the illustrated arrangement employing a linearized feed-back system including the tube 2408 is preferably to enable accurate division by a factor of 12, it will be understood that other simplified frequency dividers such as the conventional double-diode step divider may be employed if desired.

The wave form developed by the blocking oscillator tube 2412 consists of a negative pulse followed by a positive pulse and appears across the series connected resistors 2440 and 2439 connected across the anode winding of the blocking oscillator transformer 2441. These pulses which recur at a rate of 100 C. P. S. are coupled through the condenser 2442 to the anode of a clipping rectifier 2443 so poled as to block the transmission of the negative portion of the applied waveform. The rectifier 2443 is connected to the frequency divider 2402 and the divider 2402 accomplishes a further frequency division of two. More specifically, the divider 2402 includes the tubes 2409 and 2410 which are interconnected as an Eccles-Jordan trigger circuit of the so-called single security type wherein tubes 2409 and 2410 are triggered on and off by the same signals applied to the common cathode connection of these tubes. More specifically, the cathode of the rectifier 2443 is connected to the cathodes of the tubes 2409 and 2410 and to the common cathode resistor 2444 so that the positive pulses which are produced by the blocking oscillator tube 2412 and transmitted by the rectifier 2443 in the manner described above, function periodically to switch the tubes 2409 and 2410 from a conductive to a non-conductive state. Since two pulses from the blocking oscillator tube 2412 are required to complete one cycle of the Eccles-Jordan trigger circuit, it will be evident that a 50 cycle square wave is produced in the anode circuit of the tube 2410. In this connection it will be understood that the rectifier 2443 isolates the frequency divider 2402 from the frequency divider 2401 for pulses of negative polarity. Thus, the initial negative pulse generated by the blocking oscillator 2412 operates to open the rectifier 2443 and hence is not transmitted to the cathode circuit of the frequency divider 2402. As a result, improper triggering from negative pulses is completely avoided and the frequency divider 2402 is accurately and positively controlled from the previous frequency divider 2401. The 50 cycle square wave produced in the anode circuit of the tube 2410 is coupled through the condenser 2450 to the control grid of a cathode follower tube 2411 and is repeated in like phase across the cathode potentiometer 2520 thereof. A variable portion of the 50 cycle square wave may be selected at the arm of the potentiometer 2520 and is transmitted over the conductor 104 to the harmonic ringing modulator circuit 100.

In a similar manner the frequency divider 2404 produces a frequency division of 9 to 1 so that 133⅓ C. P. S. pulses are produced in the anode circuit of the blocking oscillator tube 2421 thereof. To this end the values of the condensers 2455 and 2457 and the adjustment of the potentiometer 2456 are so chosen that a frequency division of 9 to 1 is achieved. In other respects the frequency divider 2404 is substantially identical to the divider 2401 described in detail above. The positive 133⅓ C. P. S. pulses produced at the anode of the tube 2421 are coupled through the condenser 2458 and the clipping rectifier 2459 to the frequency divider 2405. The divider 2405 is identical with the divider 2402 described in detail above, the rectifier 2459 providing isolation in a manner identical with the rectifier 2443 above, and a 66⅔ C. P. S. output square wave is produced across the cathode potentiometer 2521 of the cathode follower output tube 2420. A variable portion of the 66⅔ C. P. S. wave is selected at the arm of the potentiometer 2521 and transmitted over the conductor 103 to the harmonic ringing modulator circuit 100.

In order to provide a ringing frequency of 25 C. P. S., the 50 C. P. S. output wave from the cathode follower 2411 is coupled through the condenser 2525 and the isolating rectifier 2526 to the frequency divider 2501 wherein a frequency division of two to one is produced. The frequency divider 2501 is identical with the frequency divider 2402 described in detail above, and a 25 cycle square wave is produced across the cathode potentiometer 2527 of the cathode follower output tube 2510 thereof. A variable portion of the 25 cycle square wave is produced at the arm of the potentiometer 2527 and transmitted over the conductor 106 to the harmonic ringing modulator circuit 100.

In order to provide a 33⅓ C. P. S. ringing frequency, the 66⅔ C. P. S. output from the cathode follower 2420 is coupled through the condenser 2530 and the isolating rectifier 2531 to the frequency divider 2502 wherein a frequency division of two to one is obtained. The divider 2502 is identical with the divider 2402 described in detail above and a 33⅓ C. P. S. square wave is produced across the cathode potentiometer 2532 in the cathode circuit of the cathode follower output tube 2513 thereof. A variable portion of the 33⅓ C. P. S. square wave is produced at the arm of the potentiometer 2532 and transmitted over the conductor 105 to the modulator circuit 100.

In order to provide a 16⅔ C. P. S. output wave the output of the frequency divider 2402, which constitutes a 50 C. P. S. square wave, is divided by three in the frequency divider 2500. More specifically, the frequency divider 2500 includes the tubes 2505 and 2506 which are interconnected to form a conventional multivibrator circuit. Thus, the anode of the tube 2505 is coupled through the condenser 2541 to the first control grid of the tube 2506 and the screen grid of the tube 2506 is coupled through the condenser 2542 to the control grid of the tube 2505. The frequency of the multivibrator may be adjusted by means of the potentiometers 2543 and 2544 in the respective first control grid circuits of the tubes 2505 and 2506. The cathode of the tube 2411 in the frequency divider 2402 is connected through the condenser 2540 to the cathode resistor 2545 of the tube 2505 so as to synchronize the multivibrator with the 50 C. P. S. wave produced at the cathode of the tube 2411. The frequency of the multivibrator is adjusted by means of the potentiometers 2543 and 2544 to be exactly 16⅔ C. P. S., and the condenser 2540 and resistor 2545 constitute a differentiation circuit so as to provide triggering pulses occurring at the rate of 50 C. P. S. which synchronize and control the frequency of the multivibrator. In order to isolate the output circuit of the multivibrator from the control grid circuits thereof, the anode of the tube 2506 is used as an output electrode, and a 16⅔ C. P. S. square wave is produced across the anode resistor 2546 thereof. This 16⅔ C. P. S. square wave is coupled through the resistor 2547 and the coupling condenser 2548 to the control grid of a cathode follower output tube 2507.

As described immediately above, each of the ringing frequencies produced on the conductors 103–107, inclusive, comprises a square wave which is symmetrical, i. e., has equal on and off periods, so that each ringing frequency contains only the fundamental and the odd harmonics thereof. Thus, for example, the 66⅔ C. P. S. square wave produced on the conductor 103 includes only the frequency components of the fundamental frequency, 66⅔ C. P. S., the third harmonic frequency, 200 C. P. S., etc. Of these five ringing frequencies only the 16⅔ C. P. S. square wave contains a third harmonic which would fall within the range of the other ringing frequencies and hence interfere with the tuned bell ringers at the individual substations associated with the called line. This will be readily apparent when it is realized that the third harmonic of the 16⅔ C. P. S. square wave is 50 cycles so that if any appreciable amount of third harmonic is present in the 16⅔ C. P. S. wave, the ringing facilities responsive to 50 C. P. S. current would be rung at the same time as the desired 16⅔ C. P. S. ringing facilities.

In order to eliminate the third harmonic from the 16⅔ C. P. S. wave produced on the conductor 107, a portion of the 50 C. P. S. square wave is superimposed upon the 16⅔ C. P. S. square wave in the correct phase and amplitude exactly to cancel the third harmonic of the 16⅔ C. P. S. square wave. To this end a potentiometer 2550 is connected from the cathode of the tube 2411 to the junction point of the condenser 2548 and the resistor 2547, thereby injecting a predetermined amount of 50 C. P. S. square wave into the cathode follower output stage 2507. Since the third harmonic of the 16⅔ C. P. S. square wave is approximately 30 percent of the fundamental, a substantial amount of 50 C. P. S. square wave is introduced to cancel the undesired third harmonic and the amount of injected 50 C. P. S. square wave may be adjusted by means of the potentiometer 2550. As stated above, the output circuit of the tube 2506 is isolated from the frequency determining elements of the multivibrator so that the injected 50 C. P. S. does not interfere with the proper operation of the multivibrator. Accordingly, there is produced on the output conductor 107 a 16⅔ C. P. S. square wave in which the third harmonic is eliminated. The fifth harmonic of 16⅔ C. P. S. is 83⅓ C. P. S. which is well above the highest ringing frequency so that this harmonic does not interfere with the harmonic ringing facilities at any of the substations.

As discussed generally heretofore, the harmonic ringing frequency generator 98 may be readily adapted to provide the five ringing frequencies of the decimonic frequency series, i. e., 20 C. P. S., 30 C. P. S., 40 C. P. S., 50 C. P. S. and 60 C. P. S. This end the frequency divider 2401 is modified to divide the 1200 cycle reference wave by ten instead of twelve so that the output from the divider 2401 comprises 120 C. P. S. pulses. These pulses drive the frequency divider 2402 which develops a 60 C. P. S. square wave which is impressed upon the output potentiometer 2520. The divider 2402 again drives the frequency divider 2501 so as to provide across the output potentiometer 2527 a 30 C. P. S. square wave. Also, the divider 2402 drives the divider 2500 and a portion of the 60 C. P. S. square wave is added to the divider 2500 in the manner described above so as to provide across the output potentiometer 2551, a 20 C. P. S. square wave which is devoid of any third harmonic frequency. To provide a 50 C. P. S. square wave the frequency divider 2404 is modified to divide the 1200 C. P. S. reference wave by twelve so that 100 C. P. S. pulses are produced in the output of the divider 2404 and these 100 C. P. S. pulses drive the frequency divider 2505 so that there is produced across the output potentiometer 2521 a 50 C. P. S. square wave. In order to provide a 40 C. P. S. square wave another frequency divider which can be substantially identical to the dividers 2401 and 2404 is provided and is designed to divide the 1200 C. P. S. reference wave by fifteen to develop 80 C. P. S. pulses which are used to drive the frequency divider 2502 so that there is produced across the output potentiometer 2532 a 40 C. P. S. square wave. It will thus be evident from the foregoing description that the harmonic ringing frequency generator 98 may be adapted for the decimonic series of ringing frequencies by merely employing another frequency divider and adjusting the counting rates as described above.

*Harmonic ringing code forming circuit 99*

Figure 3:
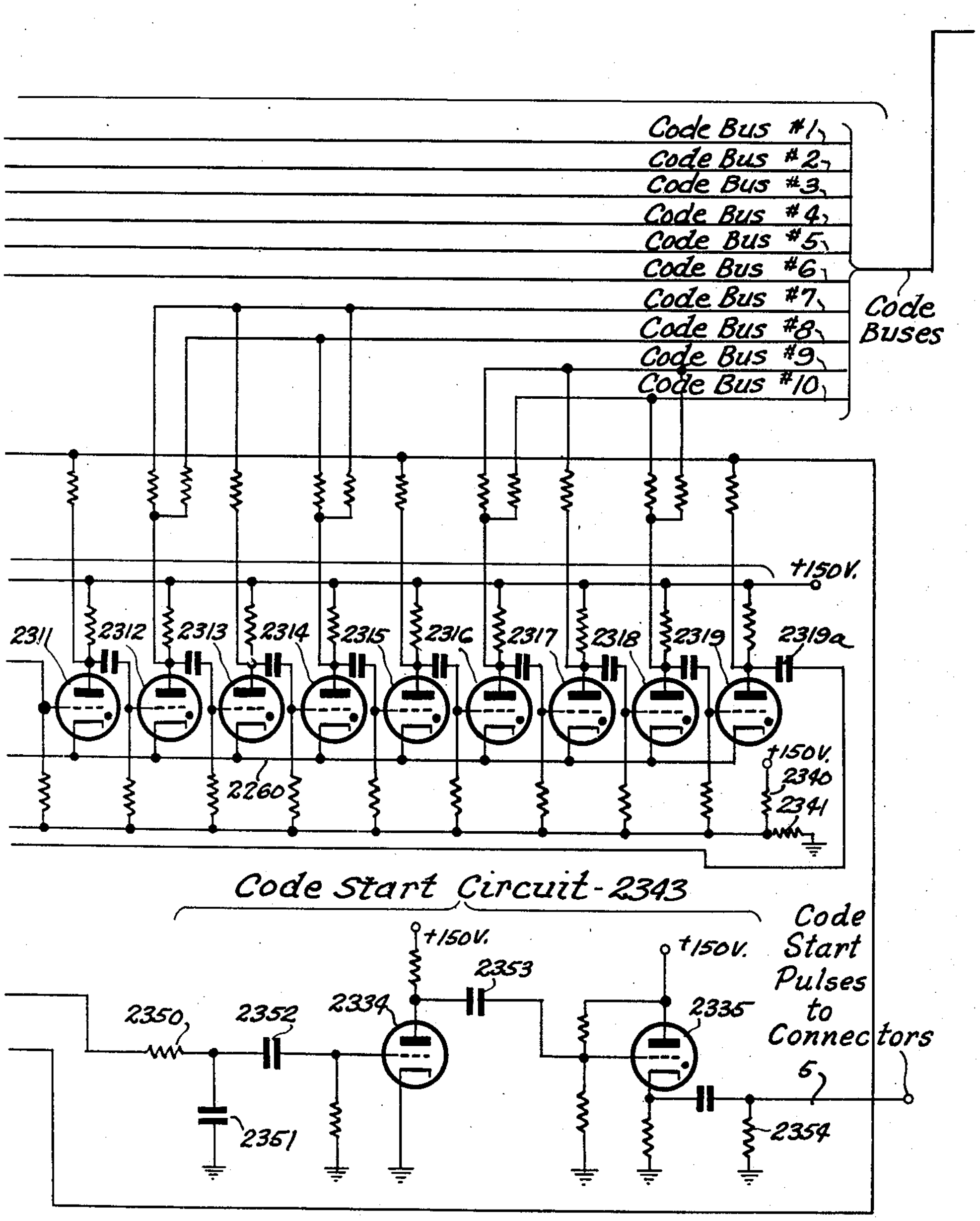

As discussed briefly in the general description of the apparatus, this circuit, the details of which are illustrated in Figs. 2 and 3 of the drawings, is provided for the general purpose of establishing a series of five successive ringing periods of approximately 1½ seconds' duration each, which recur in repetitive ringing cycles, each ringing period being separated by a short guard interval of approximately one-tenth of a second. During each ringing period the circuit 99 functions simultaneously to develop two differently coded ringing signals so that a total of ten ringing signals are produced during each ringing cycle. To this end each ringing period is divided into three code unit intervals of one-half second duration each and a long ringing pulse is produced during each ringing period by combining three successive code unit intervals. In addition, two short ringing pulses are produced during each ringing period by utilizing the first and third code unit intervals in each ringing period so that two short ringing pulses of one-half second duration separated by one-half second of silence are also produced during each ringing period.

As described generally heretofore, the coded ringing pulses produced by the circuit 99 are employed to modulate or key the continuous wave ringback tone signal supplied to the circuit 99 over the conductor **27*b* and the interrupted ringback tone signals thus formed on ten different tone buses are supplied to all of the connectors of the telephone system over the multiple conductor tone bus cable 48**. The particular interrupted ringback tone signal corresponding to the party line ringing signal assigned to the called party line substation is selected in the connector associated with the call and is used to control the intervals during which the called substations are rung. If, for example, the selected ringback tone signal occurs during the first ringing period, the ringing control facilities in the line circuit associated with the called line will release 66⅔ C. P. S. ringing current to the called line for the duration of the ringing pulses corresponding to the selected ringback tone signal.

Considering now in more detail the harmonic ringing code forming circuit 99, this circuit comprises a pulse generator 2241, a rate varying circuit 2242, a ring pulser 2240, a code forming ring circuit 2250 and a code start circuit 2343. The pulse generator 2241 is provided for the purpose of producing pulses at a predetermined low frequency rate, preferably in the order of two cycles per second, and includes a pentode tube 2231, preferably of the commercial type 6AK5, and a triode 2232, preferably of the commercial type 6C4. The tubes 2231 and 2232 are interconnected as a free running multivibrator and the frequency of the generator 2241 may be varied by means of the potentiometer 2251.

In order to provide relatively sharp drive pulses suitable for driving the code forming ring circuit 2250 from the pulse generator 2241, the output of the generator 2241 is supplied to a ring pulser 2240. Thus, the multivibrator pulses produced at the anode of the tube 2231 are coupled through the resistor 2252 and the condenser 2253 to the control grid of a cold cathode gaseous discharge tube 2230, preferably of the commercial type 5823. The cathode of the tube 2230 is connected through the resistor 2254 to ground and is also connected through the series combination of a condenser 2255 and a resistor 2256 to ground, the anode of the tube 2230 being connected to a positive source of potential. Normally, the control grid of the tube 2230 is biased somewhat positively by means of the voltage divider network including the resistors 2257 and 2258. However, the positive bias thus applied to the control grid of the tube 2230 is not sufficient to cause this tube to fire. When a positive multivibrator pulse is coupled through the condenser 2253 to the control grid of the tube 2230, this tube fires so as to produce a flow of current through the resistors 2254 and 2256 included in the cathode circuit thereof. Initially, the condenser 2255 is uncharged so that relatively large pulses of uniform magnitude are produced across the resistor 2256 in response to each multivibrator pulse produced by the generator 2241. However, after each drive pulse the condenser 2255 charges up so that the anode-cathode potential of the tube 2230 is reduced below the value at which conduction can be supported and the tube 2230 is extinguished. The resistor 2254 is also sufficiently large that the tube 2230 will not remain conductive after the condenser 2255 becomes charged. The pulser 2240 thus provides ring drive pulses of uniform amplitude and duration in response to each of the pulses generated by the generator 2241. The ring drive pulses produced by the pulser 2240 are connected directly to the common cathode ring drive conductor 2260 in the code forming ring circuit 2250.

The code forming ring circuit 2250 comprises a string of twenty pulse forming tubes 2200–2210, inclusive, and 2311–2319, inclusive, which are preferably of the cold cathode gaseous discharge commercial type 5823 and are connected in an endless series to provide a ring circuit in which only one tube of the ring is ignited at any given instant. To this end the cathodes of all of the pulse forming tubes are connected to the common ring drive conductor 2260 so that the cathodes of these tubes are all simultaneously pulsed positively to render all of the tubes non-conductive for the duration of each ring drive pulse. The anode circuit of each of the pulse forming tubes is coupled to the control grid of the next succeeding tube in the ring so that these tubes are successively switched from a non-conductive state to a conductive state and back to a non-conductive state in accordance with the ring drive pulses supplied to the ring drive conductor 2260. Thus, the anode of the first pulse forming tube 2200 is coupled through the condenser **2200*a* to the control grid of the next succeeding tube 2201. In a similar manner, the anode of each pulse forming tube is coupled to the control grid of the next succeeding tube in the ring, the last tube 2319 being coupled through the condenser 2319a to the control grid of the first tube 2200**.

The control grids of all of the pulse forming tubes are connected to a common positive potential established by the voltage divider network including the resistors 2340 and 2341. Each of the pulse forming tubes is provided with an anode resistor connected to a common positive potential source, and there is produced at the anode of each tube a negative pulse during the intervals when the tube is conducting. For example, there is provided the anode resistor 2200b connected between the anode of the tube 2200 and the positive potential source so as to provide a negative pulse at the anode of the tube 2200 during the periods when this tube is rendered conductive.

As discussed generally heretofore in conection with Fig. 8 of the drawings, each ringing period is separated by a relatively short guard interval so that the fourth, eighth, twelfth, sixteenth, and twentieth stages of the ring circuit 2250 are provided for the sole purpose of establishing guard intervals between successive groups of three pulse forming tubes. However, since it is not necessary to provide a guard interval of one-half second duration, the repetition rate of the pulse generator 2241 is increased when the ring is advanced to the fourth, eighth, twelfth, sixteenth, and twentieth stages thereof. Thus, the anodes of the tubes 2203, 2207, 2311, 2315, and 2319 are connected through isolating resistors to the rate varying circuit 2242 which latter circuit functions to vary the grid bias potential of the tube 2232 in the generator 2241. The rate varying circuit 2242 includes the tube 2233 which is preferably of the commercial type 6C4. The cathode of the tube 2233 is connected to a negative source of potential, the anode of the tube 2233 is connected through the resistor 2265 to a positive source of potential, and the tube 2233 is operated at zero bias so that the anode of hits tube is normally operated at a somewhat negative potential with respect to ground due to the voltage drop through the resistor 2265. When one of the tubes 2203, 2207, 2311, 2315 or 2319 is fired during the normal operation of the ring circuit 2250, there is produced in the anode circuit thereof a negative pulse which is coupled through the condenser 2266 to the control grid of the tube 2233 to bias this tube beyond cutoff. As a result, the anode potential of the tube 2233 increases positively so as to increase in a positive sense the grid bias potential on the tube 2232. The repetition rate of the multivibrator comprising the tubes 2231 and 2232, is controlled in part of the grid bias potential supplied to the tube 2232, as will be readily apparent to those skilled in the art, so that when the tube 2233 is cut off the repetition rate of the multivibrator is substantially increased. As a result, the generator 2241 produces its next pulse approximately one-tenth of a second after any one of the guard interval tubes 2203, 2207, 2311, 2315 and 2319 is fired so that the ring is advanced to the next succeeding stage after a short guard interval of one-tenth of a second. As soon as the ring is advanced to the next stage the guard interval tube becomes non-conductive so that the tube 2233 is again rendered conductive and the grid bias potential on the tube 2232 is brought back to normal. Accordingly, for the next three cycles the generator 2241 again has a repetition rate of approximately two cycles per second.

The outputs of the pulse forming tubes other than the guard interval tubes mentioned above are connected in predetermined combinations to the code buses numbered 1–10, inclusive. Thus, the output of the first pulse forming tube 2200 is connected through the isolating resistor 2270 to the code bus #1 and through the isolating resistor 2271 to the code bus #2. The second pulse forming tube 2201 is connected through the isolating resistor 2272 to only the code bus #1. The third pulse forming tube 2202 is connected through the isolating resistor 2273 to the code bus #1 and through the isolating resistor 2274 to the code bus #2. It is thus seen that the outputs of the three successive tubes 2200, 2201 and 2202 are connected to the code bus #1 so that the long ringing pulse 165 (Fig. 8 (1)), of negative polarity is produced on the code bus #1. Also, the outputs of the tubes 2200 and 2202 are connected to the code bus #2 so as to produce the two short ringing pulses 170 and 171 (Fig. 8 (2)), which are also of negative polarity. There is thus produced during the first ringing period a long ringing pulse on the code bus #1, and two short ringing pulses on the code bus #2. In a similar manner, the outputs of the remaining pulse forming tubes, other than the guard interval tubes, are connected through appropriate isolating resistors to the code buses 3–10, inclusive, to provide ringing pulses substantially as shown in Figs. 8 (3)–(10), inclusive.

In order to produce a code start pulse at the end of each guard interval which is supplied to the connectors of the system to control the initiation of the party line ringing operation, there is provided a code start pulse circuit 2343 comprising the tube 2334, which is preferably of the commercial type 6C4, and the tube 2335, which is preferably of the cold cathode gaseous discharge commercial type 5823. In the anode circuit of the rate varying tube 2233 a negative pulse is produced at the end of each guard interval and this pulse is integrated in the network including the resistor 2350 and condenser 2351 and coupled through the condenser 2352 to the control grid of the inverter tube 2234. This pulse appears as a positive pulse at the anode of the tube 2234 and is coupled through the condenser 2353 to the control grid of the gas tube 2335. The tube 2335 is connected as a pulser and is substantially identical to the ring pulser tube 2230 described in detail above so that there is produced across the output resistor 2354 thereof positive code start pulses of uniform amplitude and duration at the end of each guard interval which are supplied over the conductor 5 to all of the connectors of the system.

Considering now the operation of the code forming circuit 99, the pulse generator 2241 and ring pulser 2240 operate to produce relatively large positive ring drive pulses on the conductor 2260 at a normal repetition rate of two cycles per second. For the duration of each ring drive pulse all of the pulse forming tubes 2200–2210, inclusive, and 2311–2319, inclusive, are extinguished. When a conducting one of the pulse forming tubes is extinguished the positive pulse produced in the anode circuit thereof is coupled to the next succeeding pulse forming tube to turn on this tube immediately after the ring drive pulse disappears so that the pulse forming tubes are fired in endless succession at the rate of one tube for each ring drive pulse. When the fourth, eighth, twelfth, sixteenth, and twentieth tubes are fired a negative pulse is produced at the anodes of these tubes so that the rate varying tube 2233 is cut off and the repetition rate of the generator 2241 correspondingly increased. Each time the rate varying tube 2233 is rendered conductive at the end of the guard interval a code start pulse is produced by the circuit 2343 and these code start pulses are transmitted over the conductor 5 to the connectors of the system.

*Harmonic ringing modulator circuit 100*

As discussed briefly in connection with the general description of the apparatus, this circuit, which is shown in detail in Fig. 7 of the drawings, is provided for the purpose of producing interrupted ringback tone signals which individually correspond to the code numbers 1–10, inclusive, developed by the harmonic ringing code forming circuit 99 and illustrated in Fig. 8 (13)–(22), inclusive, of the drawings. The harmonic ringing modulator circuit 100 also performs the function of sequentially impressing the five different ringing frequencies upon the common output conductor 108 during the five different ringing periods of each harmonic ringing cycle.

Referring to this figure, the ringback tone signal section of the modulator circuit 100 includes a horizontal string of ten limiter and inverter tubes of which the first three tubes 1901, 1902, 1903, and the last tube 1910 are shown, a corresponding horizontal string of ten ringback tone gate tubes of which the first three tubes 1911, 1912, 1913, and the last tube 1920 are shown, and a corresponding horizontal string of ten cathode follower output tubes of which the first three tubes 1931, 1932, 1933, and the last tube 1940 are shown. The ringing frequency multiplexer section of the modulator circuit 100 includes a horizontal string of five limiter and inverter tubes of which the first two tubes 1921 and 1922 are shown, a corresponding horizontal string of five ringing frequency gate tubes of which the first two tubes 1926 and 1927 are shown, and a common cathode follower output tube 1945. The ten tubes 1901–1910, inclusive, and the five tubes 1921–1925, inclusive, are preferably of the commercial type 6AQ6, the ten tone gate tubes 1911–1920, inclusive, and the five ringing frequency gate tubes 1926–1930 inclusive, are preferably of the commercial type 6AL5, and the cathode follower tubes 1931–1940, inclusive, and 1945 are preferably of the commercial type 6C4.

Considering now the operation of the harmonic ringing modulator circuit 100 in performing the above-described functions, the continuous wave ringback tone signal is supplied over the conductor **27*b* to the ten limiter and inverter tubes 1901–1910, inclusive, through the illustrated coupling condensers 1901*c*, 1902*c*, 1903*c*–1910*c*. The long ringing pulses 165–169, inclusive (Fig. 8 (1), (3), (5), (7) and (9)), which are supplied to the odd numbered ones of the limiter and inverter tubes 1901–1910, inclusive, are also used to control the ringing frequency limiter and inverter tubes 1921–1925, inclusive. Thus, the first ringing pulse 165, which defines the first ringing period, is transmitted over the code bus #1, through the coupling condenser 1901*a*, and through a low pass filter network 1901*b* to the control grids of both of the tubes 1901 and 1921. In a similar manner the ringing pulse 166, which defines the second ringing period in each harmonic ringing cycle, is transmitted over the code bus #3, through the condenser 1903*a*, and a low pass filter network 1903*b* to the control grids of both of the tubes 1903 and 1922. In this connection it will be understood that the remaining ringing pulses 167, 168 and 169 are supplied to the corresponding odd numbered limiter and inverter tubes 1905, 1907 and 1909 and the corresponding limiter and inverter tubes 1923, 1924 and 1925, although these tubes are not shown in the drawings. The base lines of the negative ringing pulses 165–169, inclusive, are clamped to ground potential by means of diode rectifiers associated with each of the odd numbered limiter and inverter tubes 1901–1910, inclusive. Thus, the base line of the ringing pulse 165 is clamped to ground potential by means of a diode rectifier including the diode anode 1901*d* and the cathode of the tube 1901. Similarly, the base line of the ringing pulse 166 is clamped to ground by a circuit which includes the diode anode 1903*d* and the cathode of the tube 1903**.

All of the limiter and inverter tubes 1901–1910, inclusive, and 1921–1925, inclusive, are operated at zero bias so that these tubes are normally fully conductive and the anode potential thereof is normally at a relatively low level. However, the negative ringing pulses which are impressed upon the respective code buses #1–10, inclusive, are of sufficient amplitude to bias the limiter and inverter tubes well beyond cutoff, and for the interval of these ringing pulses the anode potential of each limiter and inverter tube rises to substantially the anode supply potential of 150 volts. When a particular limiter and inverter tube is rendered non-conductive by the ringing pulses impressed upon the control grid thereof, the continuous wave ringback tone signal is gated through the associated tone gate tube and the interrupted ringback tone signal thus produced is repeated through the corresponding cathode follower stage to one of the ringback tone signal conductors *48a–48j*, inclusive. Thus, considering the first limiter and inverter tube 1901, the single long ringing pulse 165, which constitutes the code #1 signal, cuts off the tube 1901 so that the anode potential thereof increases positively and causes the diode tone gate tube 1911 connected thereto to conduct. When the tube 1911 is conducting, the ringback tone signal impressed upon the anode thereof through the condenser **1901*c* is transmitted through the tube 1911 to the control grid of the cathode follower tube 1931** and is repeated therethrough. There is thus produced on the output conductor *48a* connected to the cathode of the tube 1931 the interrupted ringback tone signal **165*a* (Fig. 8 (13)), which consists of a 200 cycle tone modulated at 20 C. P. S. and persisting for the duration of the first ringing period, i. e., the duration of the pulse 165. In a similar manner when the two short ringing pulses 170 and 171 which constitute the code #2 signal, are impressed upon the control grid of the limiter tube 1902, this tube is cut off and the anode potential thereof increases positively so as to open the tone gate tube 1912. When the tube 1912 is conducting the ringback tone signal impressed upon the anode thereof through the condenser 1902*c* is transmitted through the tube 1912 to the control grid of the cathode follower 1932 and is repeated therethrough to the conductor 48*b* so as to produce on this conductor the interrupted ringback tone signal consisting of the ringback tone signal pulses 170*a* and 181*a*** shown in Fig. 8 (14). In an entirely similar manner the remaining codes #3–10, inclusive, are employed to develop corresponding interrupted tone signals which are impressed upon the output conductors *48c–48j*, inclusive, and which are transmitted to all of the connectors of the system.

It will be recalled that the long ringing pulses 165 to 169, inclusive, are developed in the code forming circuit 99 by combining three consecutive output pulses from the code forming ring circuit thereof. In combining three consecutive pulses, switching transients are produced in the transition period from one stage of the ring to the next, and if these switching transients are permitted to exist in the ringing pulse they would interfere with the proper operation of the tone gate and ringing frequency gate tubes. In order to remove these switching transients, the low pass filters **1901*b*, 1903*b*, etc., are provided and these filters reduce the amplitude of the intermediate switching transients in each long ringing pulse so that these transients do not affect the corresponding limiter and inverter tubes 1901, 1903, etc. As a result, the tubes 1901, 1903, etc., remain completely cut off for the duration of the respective ringing pulse supplied to the control grids thereof. Since the short ringing pulses which constitute the even numbered codes do not contain switching transients, no low pass filter is required in the input circuit of the corresponding limiter and inverter tubes 1902, 1904**, etc.

In order to multiplex the five different ringing frequencies upon the common output conductor 108 during the five different ringing periods of each harmonic ringing cycle, the limiter and inverter tubes 1921–1925, inclusive, and the ringing current gate tubes 1926–1930, inclusive, are employed. More specifically, the first long ringing pulse 165 is impressed upon the control grid of the limiter and inverter tube 1921 so as to render this tube non-conductive for the duration of the pulse 165. During this interval the anode potential of the tube 1921 is increased positively so as to open the corresponding ringing current gate tube 1926. The five different ringing currents, which are impressed upon the conductors 103–107, inclusive, are respectively supplied to the anodes of the ringing current gate tubes 126, 127–130, inclusive, through the respective isolating resistors **1926*a*, 1927*a*, etc. Accordingly, when the gate tube 1926 is opened for the duration of the ringing pulse 165**, the 66⅔ C. P. S.

ringing current transmitted over the conductor 103 and through the resistor 1926a to the anode of the tube 1926 is coupled through this tube to the control grid of the common output tube 1945 through the condenser 1945a. When the ringing pulse 165 ceases, the tube 1921 is again rendered conductive so as to close the ringing current gate tube 1926 and terminate the transmission of 66⅔ C. P. S. ringing current to the common output tube 1945. A short guard interval 186 exists between the ringing pulse 165 and the next ringing pulse 166 and during this guard interval no ringing current is supplied to the common output tube 1945. However, during the second ringing period the ringing pulse 166 renders the tube 1922 nonconductive so as to open the corresponding ringing current gate tube 1927 and gate a 50 C. P. S. ringing current to the common output tube 1945 for the duration of the second ringing period. In an entirely similar manner ringing frequencies of 33⅓ C. P. S., 25 C. P. S., and 16⅔ C. P. S. are successively impressed upon the control grid of the common output tube 1945 during the third, fourth and fifth ringing periods. The multiplexed ringing currents which are impressed upon the control grid of the tube 1945 are repeated through this tube and transmitted over the common conductor 108 to the harmonic ringing amplifier and supply circuit 101.

*Harmonic ringing amplifier and supply circuit 101*

As discussed generally in connection with the general description of the apparatus, this circuit, which is shown in detail in Fig. 6 of the drawings, performs the functions of amplifying the commutated or multiplexed ringing frequencies to a sufficient power and voltage level to operate the tuned bell ringers in the subscribers' subsets, filtering the square waves from the ringing frequency sources to obtain a multiplexed wave form suitable for ringing purposes, and eliminating the transient disturbances resulting from abrupt switching from one ringing frequency to another. More specifically, the harmonic ringing amplifier and supply circuit 101 includes a filter indicated generally at 2610, a first amplifier stage including the tube 2604, a phase inverter stage including the tube 2605, a push-pull driver stage including the tubes 2602 and 2603 and a push-pull power output stage including the tubes 2600 and 2601. The tubes 2602 to 2605, inclusive, are preferably of the commercial type 6C4, and the tubes 2600 and 2601 are preferably of the commercial type 6L6.

Considering now the operation of the ringing amplifier and supply circuit 101, it will be recalled that each of the ringing frequencies commutated to the conductor 108 by the modulator circuit 100 comprises a symmetrical rectangular square wave which contains a fundamental frequency and odd harmonics thereof. The higher harmonics of the ringing frequency square waves fall within the audio frequency range of the telephone system and hence must be eliminated since the ear is quite sensitive in the lower audio frequency range, i. e., 1,000 to 2,000 cycles, and the amplitude of the ringing frequencies is approximately 100 volts R. M. S. for the fundamental. It will be evident that ringing cross-talk in the earphones of the subscribers' subsets will be present from other lines of the system unless the harmonics are eliminated before transmission to the various line circuits of the system. Even though twisted pair cables are employed to reduce coupling between the lines of the system, ringing cross-talk is produced unless these harmonics are eliminated or very substantially attenuated. Furthermore, the ringing frequency square waves are not of a suitable form to excite the tuned harmonic ringing facilities at the substations, a sinusoidal wave being preferred for this purpose.

In order to convert the ringing frequency square waves successively commutated to the output conductor 108 in the modulator circuit 100 into sinusoidal waves without substantial harmonic distortion, there is provided in the ringing amplifier and supply circuit 101 the filter 2610. The filter 2610 includes a low pass five-section RC network including the series resistors 2611, 2612, 2613, 2614, and 2615, and the shunt condensers 2616, 2617, 2618, 2619 and 2620. The output from the low pass RC filter is coupled through the condenser 2621 to a parallel-T filter network including the condensers 2622, 2623 and 2624, and the resistors 2625, 2626 and 2627. The parallel-T filter network provides sharp cutoff and has a null point at approximately 350 C. P. S. The over-all frequency characteristic of the filter 2610 is such that only 2½ db variation is experienced in the frequency range from the 16⅔ C. P. S. fundamental frequency to the 66⅔ C. P. S. fundamental frequency, while a 23 db loss is produced at 200 cycles, and a maximum of 40.5 db loss is achieved at 350 C. P. S. As a result the filter 2610 removes the higher frequency harmonics of the ringing frequencies and particularly the higher harmonics of the 50 and 66⅔ C. P. S. ringing frequencies. Accordingly, ringing cross-talk between the lines of the system is avoided. It will be noted that with the above-described system wherein the third harmonic of the 16⅔ ringing frequency is canceled before this ringing frequency is multiplexed to the common output conductor 108, the single low pass filter 2610 is employed to remove the higher harmonics from all of the ringing frequencies. There is thus produced across the output resistor 2628 of the filter 2610 the multiplexed ringing frequency wave substantially as shown in Fig. 8 (12). In this connection it will be understood that the guard intervals 186 which separate the ringing periods are provided to permit change from one ringing frequency to another without affecting the ringing operation on the called line. The multiplexed ringing frequency wave produced across the resistor 2628 is impressed upon the control grid of the amplifier 2604 and is amplified therein and coupled through the condenser 2630 to the control grid of the phase inverter tube 2605. The phase inverter tube 2605 provides push-pull signals at the cathode and anode thereof which are coupled through the condensers 2631 and 2632 to the control grids of the driver tubes 2603 and 2602. The push-pull gain and driver stage, including the tubes 2602 and 2603, is required since the power output stage has substantially no voltage gain and a relatively high output voltage is required on the output conductor 61a for operating the ringing facilities at the substations.

In order to produce the required output voltage a step-up transformer indicated generally at 2635 is provided, the primary of which is connected to the anodes of the tubes 2602 and 2603, and the secondary 2636 of which is connected to the control grids of the output tubes 2600 and 2601. Since the transformer 2635 is required to pass 16⅔ C. P. S. waves without appreciable loss and distortion, a push-pull type of transformer is employed to eliminate the effects of unidirectional magnetic flux in the core and to eliminate the use of very large coupling condensers and shunt feeding arrangements. The primary and secondary windings of the transformer 2635 are bifilar wound to provide very close coupling between these windings. Because of the danger of insulation failure between the two windings which operate at a substantial difference in potential on both a D. C. and an A. C. basis, a protective network 2637 consisting of four ¼ watt neon lamps in series is placed across one-half of the secondary winding 2636. With this arrangement any excessive A. C. signal or D. C. potential is suppressed by the ignition of these lamps which also provide a visual indication of the overload condition.

The power output stage, including the tubes 2600 and 2601, is so arranged that these tubes are operated as cathode followers and an output signal is derived from the cathodes of these tubes. Thus, an output transformer, indicated generally at 2640, is provided with a primary winding 2641 connected between the cathodes of the tubes 2600 and 2601, an auxiliary winding 2642 which is connected between the screen grids of the tubes 2600 and 2601, and a secondary or output winding 2643 across which is produced the multiplex ringing frequency wave which is used to energize the ringing facilities at all of the substations of the system. In order to provide for proper operation of the beam power output tubes 2600 and 2601 it is necessary to maintain the screen potential substantially constant with respect to the cathode potential of each of the tubes 2600 and 2601. Accordingly, the auxiliary winding 2642, which is connected to the screen grids of the tubes 2600 and 2601, is tightly coupled to the cathode winding 2641 so that substantially a 1:1 transformer radio is provided and the screen potential rises and falls in exactly the same proportion as does the cathode potential of each of the tubes 2600 and 2601. With this arrangement these tubes operate as true beam power amplifiers although a cathode follower type of operation is provided. In order to keep the phase relationship between the cathode and screen potentials as nearly perfect as possible, both halves of the screen windings 2641 and 2642 are wound bifilarly, that is, all four conductors are wound parallel to one another on the core of the transformer. With this arrangement both halves of the push-pull output stage are tightly coupled and if necessary the output stage may be run in a class AB2 or class B service for greater output. However, in the illustrated embodiment a bias potential of −22½ volts is provided and these tubes are operated class A.

In order to protect the windings of the output transformer 2640 there is provided a protective network 2645 consisting of four ¼ watt neon lamps in series which is placed across one-half of the cathode winding 2641. With this arrangement insulation breakdown in the event of excessive signals is prevented by the ignition of these neon lamps.

Although the output impedance of the tubes 2600 and 2601, when operated as cathode followers, is relatively low, the output transformer 2640 is designed to match the expected load of approximately 500 ohms represented by ten harmonic ringers in parallel to the conventional plate load for the tubes 2600 and 2601. With this arrangement the source impedance is made to appear extremely low and the combined regulation of both the output tubes 2600 and 2601 and the transformer 2640 is better than 10 percent between no load and full load at any frequency. Due to the fact that all feedback in the ringing amplifier is in the form of degeneration, the feedback networks are extremely simple. Also, due to the fact that the windings of the driver transformer 2635 and the output transformer are very tightly coupled, the ringing amplifier is virtually free from transient disturbances arising from the abrupt switching of input frequencies are multiplexed to the common conductor 108. As a result, the ringing amplifier provides a substantially transient-free output wave.

The output winding 2643 of the transformer 2640 is connected in series with a unidirectional source of potential 2650 to the ringing current conductor 61*a* which is multiplied to all of the line circuits of the system. Also, a bias potential source 2651 is connected between the ringing current conductor 61*a* and the conductor 61*b* to provide a bias potential for the ringing control tubes in each of the line circuits of the system, as described in more detail in the above identified copending application.

While the oscillator 97 and ringing frequency generator 98 have been described in connection with a ringing frequency multiplex arrangement wherein all of the ringing frequencies are successively impressed on a common output channel, it will be understood that the five output frequencies of the generator 98 may equally well be employed as individual ringing frequency sources to excite the ringing facilities of a telephone system by the use of conventional control equipment.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. Ringing apparatus for developing different ringing frequencies adapted to excite the ringing facilities of a telephone system, comprising a reference frequency signal source of relatively high frequency, means for deriving from said source a plurality of relatively low frequency square waves having fundamental frequencies which are multiples of one another, and means including a single low pass filter for converting all of said square waves into sine waves of corresponding frequency.

2. Ringing apparatus for developing different ringing frequencies adapted to excite the ringing facilities of a telephone system, comprising a reference frequency signal source of relatively high frequency, means for deriving from said source a plurality of relatively low frequency square waves having fundamental frequencies which are multiples of one another, and means including a single low pass filter for removing the third and higher odd harmonics from said square waves, thereby to develop substantially pure sine waves at the frequencies of said square waves.

3. Ringing apparatus for developing different ringing frequencies adapted to excite the ringing facilities of a telephone system, comprising a reference frequency signal source of a relatively high frequency, means for deriving from said source a plurality of relatively low frequency square waves having fundamental frequencies which are multiples of one another, means including a single low pass filter for removing the third and higher odd harmonics from said square waves, thereby to develop substantially pure sine waves at the frequencies of said square waves, and means independent of said filter for removing the third harmonic of the lowest frequency one of said square waves.

4. Ringing apparatus for developing different ringing frequencies adapted to excite the ringing facilities of a telephone system, comprising a reference frequency signal source of relatively high frequency, means for deriving from said source a plurality of relatively low frequency square waves having fundamental frequencies at 16⅔ cycles per second, 25 cycles per second, 33⅓ cycles per second, 50 cycles per second and 66⅔ cycles per second, each of said square waves containing only odd harmonics of said fundamental frequencies, means including a single low pass filter for removing the third and higher harmonics from all but said 16⅔ cycle per second square wave, and means for combining said 50 cycle per second square wave and said 16⅔ cycle per second square wave to cancel the third harmonic of said 16⅔ cycle per second square wave.

5. Ringing apparatus for developing different ringing frequencies adapted to excite the ringing facilities of a telephone system, comprising a reference frequency signal source of relatively high frequency, means for deriving from said source a plurality of relatively low frequency square waves having fundamental frequencies which are harmonically related, means including a single low pass filter for removing the third and higher harmonics from all of said square waves except the lowest frequency one thereof, and means independent of said filter for removing the third harmonic of said lowest frequency square wave.

6. Ringing apparatus for developing different ringing frequencies adapted to excite the ringing facilities of a telephone system, comprising a reference frequency signal source of relatively high frequency, means for deriving from said source a plurality of relatively low frequency square waves having fundamental frequencies which are harmonically related, multiplexing means for impressing said square waves on a common channel during different ringing periods in repetitive ringing cycles, and means including a single low pass filter for converting said multiplexed square waves into sine waves of corresponding frequency.

7. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, and multiplexing means for sequentially impressing said low frequency waves on a common channel during different ringing periods in repetitive ringing cycles.

8. Ringing apparatus for developing different ringing frequencies adapted to excite the ringing facilities of a telephone system, comprising a reference frequency signal source of relatively high frequency, means for deriving from said source a plurality of relatively low frequency waves having fundamental frequencies which are harmonically related, and multiplexing means for sequentially impressing said low frequency waves on a common channel during different ringing periods in repetitive ringing cycles.

9. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, means for generating a plurality of control pulses which define different ringing periods in repetitive ringing cycles, and multiplexing means controlled by said control pulses for sequentially impressing said low frequency waves on a common output channel.

10. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, a ringback tone signal source, means for generating a plurality of control pulses which define different ringing periods in repetitive ringing cycles, a plurality of output conductors, gating means controlled by said control pulses for sequentially gating a ringback tone signal from said source to said output conductors, and multiplexing means controlled by said control pulses for sequentially impressing said low frequency waves on a common output channel.

11. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, means for individually impressing said low frequency waves on different ones of a plurality of output conductors, and multiplexing means for sequentially connecting said output conductors to a common output channel during different ringing periods in repetitive ringing cycles.

12. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, means for individually impressing said low frequency waves on different ones of a plurality of first output conductors, a ringback tone signal source, means for generating a plurality of control pulses which define different ringing periods in repetitive ringing cycles, a second set of output conductors, gating means controlled by said control pulses for sequentially gating a signal from said ringback tone signal source to said set of output conductors, and multiplexing means controlled by said control pulses for sequentially connecting said first output conductors to a common output channel, thereby sequentially to impress said low frequency waves on said common output channel.

13. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, a plurality of tubes, means connecting said tubes in endless series, means for sequentially rendering said tubes conductive at a predetermined rate, means for deriving from predetermined ones of said tubes control pulses which define different ringing periods in repetitive ringing cycles, and multiplexing means controlled by said control pulses for sequentially impressing said low frequency waves on a common output channel.

14. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, a ring circuit including a plurality of tubes, means for rendering the tubes of said ring circuit conductive in predetermined sequence, one cycle of said ring circuit constituting a ringing cycle, means for sequentially deriving control pulses from predetermined ones of said tubes during successive ringing periods in said ringing cycles, and multiplexing means controlled by said control pulses for sequentially impressing said low frequency waves on a common output channel.

15. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, a pulse generator, a plurality of tubes connected in endless series, means controlled by said pulse generator for sequentially rendering said tubes conductive, means controlled by predetermined ones of said tubes for varying the frequency of said pulse generator, means for deriving from said tubes control pulses of relatively long duration which are separated by guard intervals of relative short duration and define different ringing periods in repetitive ringing cycles, and multiplexing means controlled by said control pulses for sequentially impressing said low frequency waves on a common output channel during said ringing periods.

16. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, means for developing control pulses of relatively long duration which are separated by guard intervals of relatively short duration and define different ringing periods in repetitive ringing cycles, and multiplexing means controlled by said control pulses for sequentially impressing said low frequency waves on a common output channel only during said ringing periods.

17. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, means for developing control pulses of relatively long duration which are separated by guard intervals of relatively short duration and define different ringing periods in repetitive ringing cycles, multiplexing means controlled by said control pulses for sequentially impressing said low frequency waves on a common output channel only during said ringing periods, and means for developing code start pulses during said guard intervals.

18. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, a pulse generator, a plurality of tubes connected in endless series, means controlled by said pulse generator for sequentially rendering said tubes conductive, means controlled by predetermined ones of said tubes for developing a first group of control pulses of relatively long duration which are separated by guard intervals of relatively short duration and define different ringing periods in repetitive ringing cycles, means controlled by predetermined ones of said tubes for developin a second group of control pulses which occur during said ringing periods and have a duration different from said first group of pulses, multiplexing means controlled by said first group of pulses for sequentially impressing said low frequency waves on a common output channel, a plurality of output conductors, a ringback tone signal source, and gating means controlled by said first and second groups of control pulses for gating signals from said source to said output conductors.

19. Ringing apparatus for developing different ringing frequencies adapted to excite the ringing facilities of a telephone system, comprising a reference frequency signal source of relatively high frequency, means for deriving from said source a plurality of relatively low frequency waves having a predetermined fundamental frequency relationship, a pulse generator, a plurality of tubes connected in endless series, means controlled by said pulse generator for sequentially rendering said tubes conductive, means controlled by predetermined ones of said tubes for developing a first group of control pulses of relatively long duration which are separated by guard intervals of relatively short duration and define different ringing periods in repetitive ringing cycles, means controlled by predetermined ones of said tubes for developing a second group of control pulses which occur during said ringing periods and have a duration different from said first group of pulses, multiplexing means controlled by said first group of pulses for sequentially impressing said low frequency waves on a common output channel, a plurality of output conductors, a ringback tone signal source, gating means controlled by said first and second groups of control pulses for gating signals from said source to said output conductors, and means for deriving code start pulses from said tubes during said guard intervals.

References Cited in the file of this patent

UNITED STATES PATENTS

| | | |
|---|---|---|
| 2,655,560 | Davison et al. | Oct. 13, 1953 |
| 2,667,632 | Grandstaff | Jan. 26, 1954 |
| 2,674,734 | McCreary | Apr. 6, 1954 |
| 2,677,768 | Davison et al. | May 4, 1954 |
| 2,706,751 | Davison et al. | Apr. 19, 1955 |
| 2,714,632 | Hall et al. | Aug. 2, 1955 |
| 2,745,008 | Grandstaff | May 8, 1956 |

UNITED STATES PATENT OFFICE

CERTIFICATE OF CORRECTION

Patent No. 2,832,838 April 29, 1958

Robert B. Trousdale

It is hereby certified that error appears in the printed specification of the above numbered patent requiring correction and that the said Letters Patent should read as corrected below.

Column 1, line 58, for "There" read -- These --; column 4, line 38, for "riging" read -- ringing --; line 75, for "171b" read -- 171a --; column 5, line 10, for "Fig. 2" read -- Fig. 8 --; column 13, line 39, for "hits" read -- this --; column 14, line 30, for "2234" read -- 2334 --; column 23, line 23, for the syllable "in" read -- ing --.

Signed and sealed this 15th day of July 1958.

(SEAL)

Attest:

KARL H. AXLINE
Attesting Officer

ROBERT C. WATSON
Commissioner of Patents